United States Patent
Maret et al.

(10) Patent No.: US 10,619,500 B2
(45) Date of Patent: Apr. 14, 2020

(54) PILOTED RETAINING PLATE FOR A FACE SEAL ARRANGEMENT

(71) Applicant: United Technologies Corporation, Farmington, CT (US)

(72) Inventors: Alexander J. Maret, Middletown, CT (US); Jonathan Logan Miller, Ware, MA (US)

(73) Assignee: United Technologies Corporation, Farmington, CT (US)

(*) Notice: Subject to any disclaimer, the term of this patent is extended or adjusted under 35 U.S.C. 154(b) by 289 days.

(21) Appl. No.: 15/030,768

(22) PCT Filed: Oct. 16, 2014

(86) PCT No.: PCT/US2014/060927
§ 371 (c)(1),
(2) Date: Apr. 20, 2016

(87) PCT Pub. No.: WO2015/061132
PCT Pub. Date: Apr. 30, 2015

(65) Prior Publication Data
US 2016/0265375 A1 Sep. 15, 2016

Related U.S. Application Data

(60) Provisional application No. 61/894,015, filed on Oct. 22, 2013.

(51) Int. Cl.
*F01D 11/00* (2006.01)
*F16J 15/34* (2006.01)
(Continued)

(52) U.S. Cl.
CPC .............. *F01D 11/003* (2013.01); *F02C 3/04* (2013.01); *F16J 15/3472* (2013.01);
(Continued)

(58) Field of Classification Search
CPC ....... F01D 11/003; F01D 11/005; F16J 15/30; F16J 15/3472; F02C 7/28
See application file for complete search history.

(56) References Cited

U.S. PATENT DOCUMENTS 4,114,899 A    9/1978 Kulzer et al.
4,586,719 A *  5/1986 Marsi .................... F04D 29/126
                                                277/361
(Continued)

FOREIGN PATENT DOCUMENTS

CH    676383      1/1991
DE    1675200    12/1970
(Continued)

OTHER PUBLICATIONS

Supplementary Partial European Search Report for Application No. 14856274.7 dated Sep. 15, 2016.
(Continued)

*Primary Examiner* — Todd E Manahan
*Assistant Examiner* — Katheryn A Malatek
(74) *Attorney, Agent, or Firm* — Carlson, Gaskey & Olds, P.C.

(57) ABSTRACT

A face seal includes a seal carrier defining an axis and having a pilot flange, a seal element disposed at least partially in the seal carrier, and a retaining plate connected to one axial end of the seal carrier. The retaining plate has an axial step disposed circumferentially about the retaining plate. The axial step is interfaced with the pilot flange.

10 Claims, 4 Drawing Sheets

(51) Int. Cl.
*F02C 3/04* (2006.01)
*F02C 7/28* (2006.01)

(52) U.S. Cl.
CPC ............. *F01D 11/005* (2013.01); *F02C 7/28* (2013.01); *F05D 2220/32* (2013.01); *F05D 2240/55* (2013.01)

(56) References Cited

U.S. PATENT DOCUMENTS

| | | | |
|---|---|---|---|
| 4,768,790 | A | 9/1988 | Netzel et al. |
| 4,934,254 | A | 6/1990 | Clark et al. |
| 5,039,113 | A * | 8/1991 | Gardner ............... F16J 15/3412 277/348 |
| 5,174,584 | A | 12/1992 | Lahrman |
| 5,622,438 | A | 4/1997 | Walsh et al. |
| 6,132,168 | A | 10/2000 | Kovaleski et al. |
| 6,196,790 | B1 * | 3/2001 | Sheridan ............... F01D 11/003 415/111 |
| 6,425,583 | B1 | 7/2002 | Muraki |
| 7,175,388 | B2 | 2/2007 | Labbe et al. |
| 7,410,341 | B2 | 8/2008 | Gockel et al. |
| 7,837,199 | B2 | 11/2010 | Craig et al. |
| 7,946,590 | B2 | 5/2011 | Dobek et al. |
| 8,167,545 | B2 | 5/2012 | Glahn et al. |
| 2007/0096398 | A1 | 5/2007 | Miller et al. |
| 2007/0096399 | A1 * | 5/2007 | Miller ..................... F01D 11/00 277/377 |

FOREIGN PATENT DOCUMENTS

| | | |
|---|---|---|
| DE | 1750059 | 1/1971 |
| EP | 0177161 | 4/1986 |
| EP | 0438346 | 7/1991 |
| EP | 1010926 | 6/2000 |
| FR | 2503311 | 10/1982 |
| GB | 2043183 | 10/1980 |
| JP | 05156968 | 6/1993 |
| WO | 9405936 | 3/1994 |

OTHER PUBLICATIONS

Supplementary European Search Report for Application No. 14856274.7 dated Jan. 16, 2017.
International Preliminary Report on Patentability for Application No. PCT/US2014/060927 dated May 6, 2016.
International Search Report and Written Opinion for PCT Application No. PCTY/US2014/060927, dated Jan. 27, 2015.
The Partial European Search Report for EP Application No. 19166883.9, dated May 23, 2019.
The Extended European Search Report for EP Application No. 19166883.9, dated Sep. 17, 2019.

* cited by examiner

PILOTED RETAINING PLATE FOR A FACE SEAL ARRANGEMENT

CROSS-REFERENCE TO RELATED APPLICATION

This application claims priority to U.S. Provisional Application No. 61/894,015 filed on Oct. 22, 2013.

BACKGROUND OF THE INVENTION

The present disclosure relates generally to a face seal for a gas turbine engine and more particularly to a retaining plate for the same.

High performance gas turbine engines include main shaft bearing compartments and employ seals to prevent cooling/lubricating oil from escaping from the bearing compartments into the rest of the engine. One type of seal commonly used for this function is a face seal. Face seals enable the engine, and bearing compartments within the engine, to function properly with minimal impact on a Thrust Specific Fuel Consumption (TSFC), the Thermal Management System (TMS), and the lubrication system of the gas turbine engine.

In some face seals, a component, such as a retaining plate, is utilized to maintain the sealing element in position within the face seal. Existing retaining plates include a large overlap between the retaining plate and a seal element in order to ensure that a full 360 degree arc of the seal element is covered by the retaining plate. The overlap between the retaining plate and the seal element is referred to as a "seal overlap". When the gas turbine engine includes particularly small gapping and/or physical space and geometry requirements, a large seal overlap can disqualify the existing retaining ring based carbon seal designs.

SUMMARY OF THE INVENTION

A face seal assembly according to an exemplary embodiment of this disclosure, among other possible things includes a seal carrier defining an axis and having a pilot flange disposed circumferentially about the axis, a seal element disposed at least partially in the seal carrier, a retaining plate connected to one axial end of the seal carrier, the retaining plate having an axial step disposed circumferentially about the retaining plate, and the axial step is interfaced with the pilot flange.

In a further embodiment of the foregoing face seal, the seal element is a graphitic carbon face seal.

A further embodiment of the foregoing face seal includes a gap between the axial step and the pilot flange, such that the seal element is loose fit to the pilot flange.

In a further embodiment of the foregoing face seal, the retaining plate further includes a plurality of radially outward retainer flanges and the seal carrier comprises a plurality of radially outward carrier flanges, and each of the retainer flanges corresponds to one of the carrier flanges.

A further embodiment of the foregoing face seal includes a coil spring guide connecting each carrier flange to the corresponding retainer flange.

In a further embodiment of the foregoing face seal, the axial step includes a pilot surface facing radially inward and facing the pilot flange.

In a further embodiment of the foregoing face seal, the retaining plate further comprises a seal overlap, and the seal overlap radially covers the seal element on a full 360 degree arc.

In a further embodiment of the foregoing face seal, a radial length of the seal overlap is greater than a maximum possible radial misalignment of retaining plate relative to an axis defined by the seal element.

In a further embodiment of the foregoing face seal, the radial length of the seal overlap is approximately equal to the maximum possible radial misalignment of the retaining plate relative to the axis defined by the seal element.

A gas turbine engine according to an exemplary embodiment of this disclosure, among other possible thing includes a compressor section connected to a first turbine spool, a combustor fluidly connected to the compressor section, a turbine section fluidly connected to the combustor and connected to a second turbine spool, an engine static structure connected to the first spool and the second spool via a plurality of bearing systems, at least one face seal assembly sealing at least one of the bearing systems, the at least one face seal assembly includes a seal carrier defining an axis and having a pilot flange disposed circumferentially about the axis, a seal element disposed at least partially in the seal carrier, a retaining plate connected to one axial end of the seal carrier, the retaining plate having an axial step disposed circumferentially about the retaining plate, and the axial step is interfaced with the pilot flange.

In a further embodiment of the foregoing gas turbine engine, the axial step includes a pilot surface facing radially inward and facing the pilot flange.

In a further embodiment of the foregoing gas turbine engine, the retaining plate includes a seal overlap, and the seal overlap radially covers the seal element on a full 360 degree arc.

In a further embodiment of the foregoing gas turbine engine, a radial length of the seal overlap is greater than a maximum possible radial misalignment of retaining plate relative to the axis defined by the seal element.

A retaining plate for a face seal according to an exemplary embodiment of this disclosure, among other possible things includes a main retaining plate body including a ring defining an axis, an axial step in the retaining plate body, a seal overlap extending radially inward from the axial step, and a plurality of retainer flanges extending radially outward from the retaining plate.

In a further embodiment of the foregoing retaining plate, the axial step is an axial shift in the main retaining plate body.

In a further embodiment of the foregoing retaining plate, the axial step comprises a radially inward facing pilot surface.

In a further embodiment of the foregoing retaining plate, a radial length of the seal overlap is defined by a tolerance of the axial step.

In a further embodiment of the foregoing retaining plate, the plurality of flanges is disposed circumferentially evenly about the retaining plate.

In a further embodiment of the foregoing retaining plate, the plurality of flanges is disposed circumferentially unevenly, and circumferentially balanced about the retaining plate.

In a further embodiment of the foregoing retaining plate, each flange in the plurality of flanges includes a through hole operable to receive a coil spring guide.

The foregoing features and elements may be combined in any combination without exclusivity, unless expressly indicated otherwise.

These and other features of the present invention can be best understood from the following specification and drawings, the following of which is a brief description.

DETAILED DESCRIPTION OF AN EMBODIMENT

Figure 1:
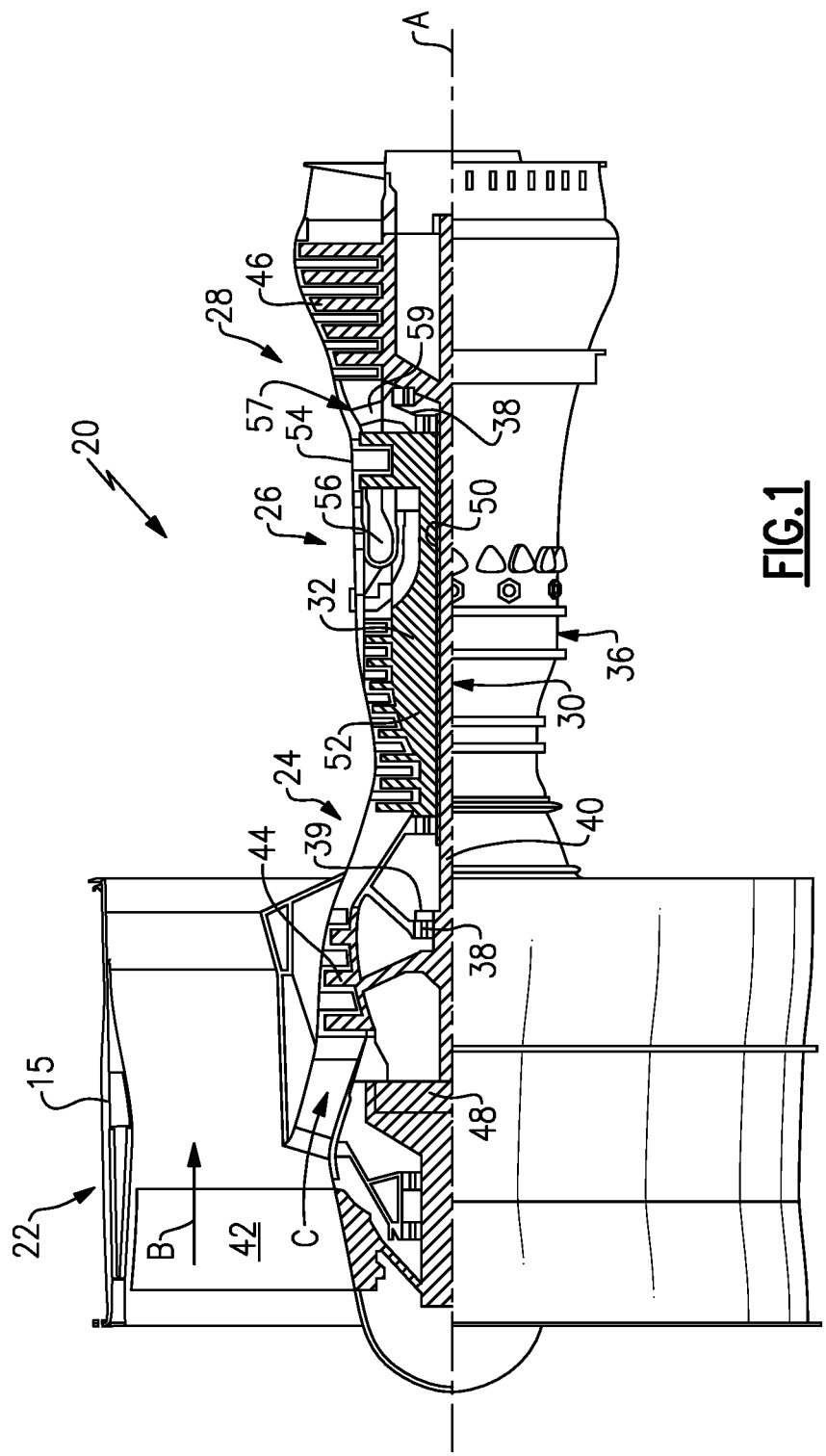
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. A face seal 39 is positioned adjacent to one or more of the bearing systems 38 and seals the bearing systems 38. Although only illustrated in a single position, it is understood that face seals 39 can be utilized throughout the gas turbine engine 20 in alternate positions. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
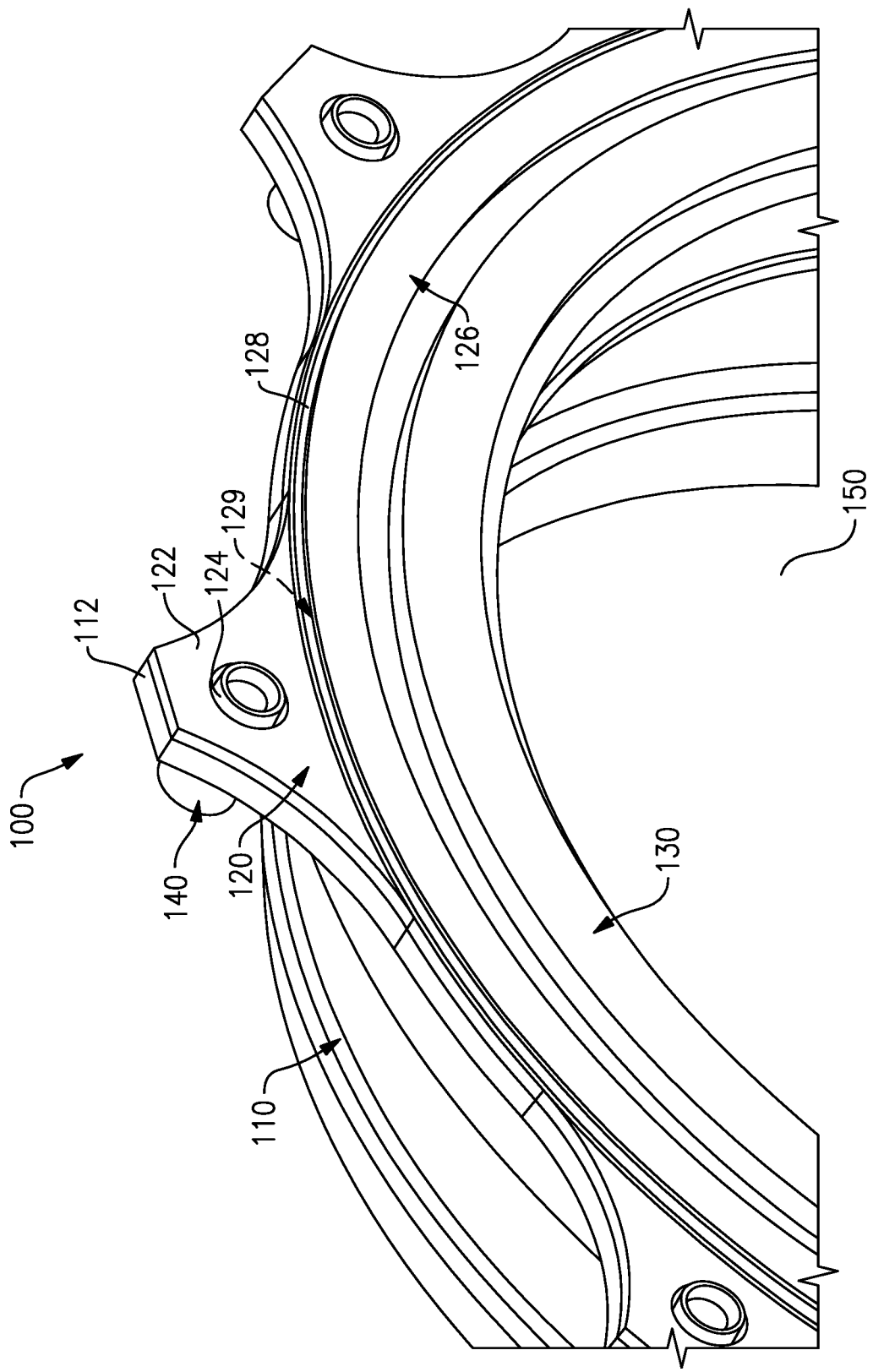
FIG. 2 schematically illustrates a partial isometric view of a face seal for use in the gas turbine engine of FIG. 1.
Figure 3A:
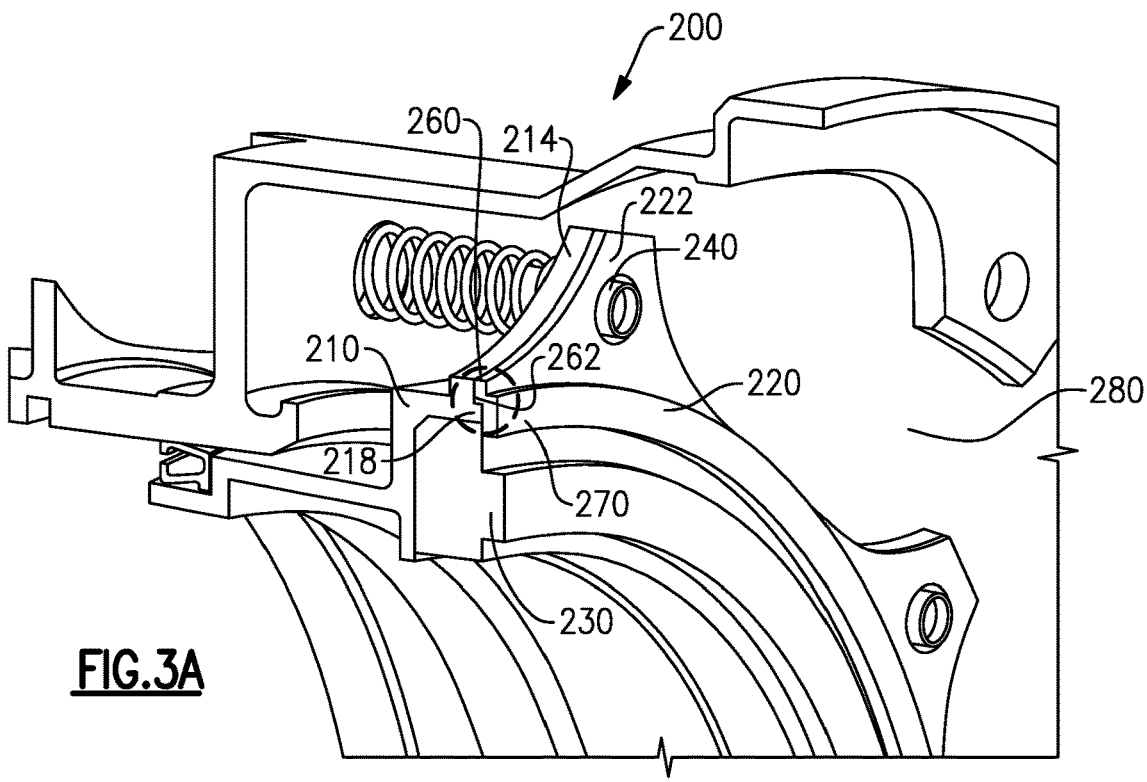
FIG. 3A schematically illustrates a partial cross sectional view of a face seal in an installed position.
Figure 3B:
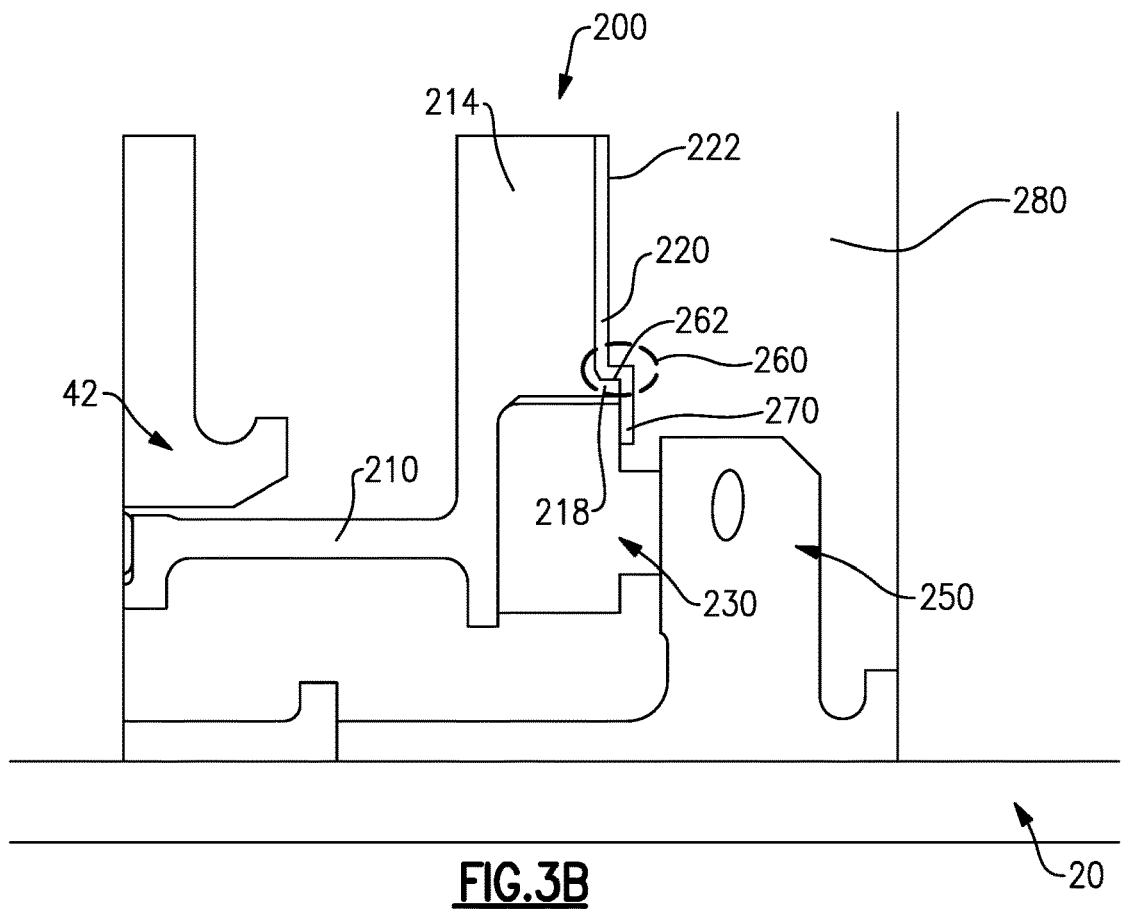
FIG. 3B Schematically illustrates a full cross sectional view of the face seal of FIG. 3A.

FIG. 2 schematically illustrates an isometric view of an assembled face seal 100 for use in a gas turbine engine such as the gas turbine engine 20 of FIG. 1. The face seal 100 includes a seal carrier 110, alternately referred to as a "carrier" or "housing". The seal carrier 110 defines an axis which is collinear with the engine centerline axis A. Disposed partially within the seal carrier 110 is a sealing element 130. In one example, the sealing element 130 is a graphitic carbon face seal. The sealing element 130 is retained in position axially by a retaining plate 120 and radially by an interference fit between an outer diameter of the sealing element 130 and the seal carrier 110. The face seal 100 is axially aligned with an engine shaft, that protrudes through a central opening 150 defined by the face seal 100. The sealing element 130 interfaces with an axially adjacent seal seat 250 (illustrated in FIG. 3B) to seal a bearing compartment of the gas turbine engine 20. In alternate examples, the face seal 100 can be utilized to seal any similar configuration and is not limited to a bearing compartment.

Each of the seal carrier 110 and the retaining plate 120 includes multiple radially outward flanges 112, 122. When the face seal 100 is assembled, each of the seal carrier flanges 112 corresponds directly to one of the retaining plate flanges 122. The flanges 112, 122 are maintained in position relative to each other via a coil spring guide 140 that protrudes through an opening 124 in the retaining plate flange 122 and a hidden opening in the seal carrier flange 112.

In prior retaining plate designs, the retaining plate is approximately straight along a radial line drawn from an axis defined by the central opening, and includes a substantial seal overlap that overlaps the sealing element. The seal overlap maintains the sealing element in position axially by ensuring that a full 360 degree arc of the sealing element is overlapped by the retaining plate. The flanges and coil spring guides approximately radially center the retaining plate relative to the sealing element. The amount of seal overlap required in any given face seal is determined by the tolerances of the centering mechanisms. Because the previous designs use the flanges and the coil spring guides as the centering mechanism for the retaining plate, there are multiple tolerances (at each of the flanges and the coil spring guide holes) that compound to require a substantial seal overlap.

The retaining plate 120 of the instant disclosure includes a radially shortened seal overlap 126 relative to prior retaining plates. The seal overlap 126 extends radially inward from an axial step region 128 and a pilot portion hidden. The pilot portion is a radially inward surface of the axial step 128 and operates in conjunction with a pilot flange 218 (illustrated in FIGS. 3A and 3B) of the seal carrier 110 to radially center the retaining plate 120 and provide a full circumferential radial constraint on the sealing element 130 via a single centering feature.

Figure 4:
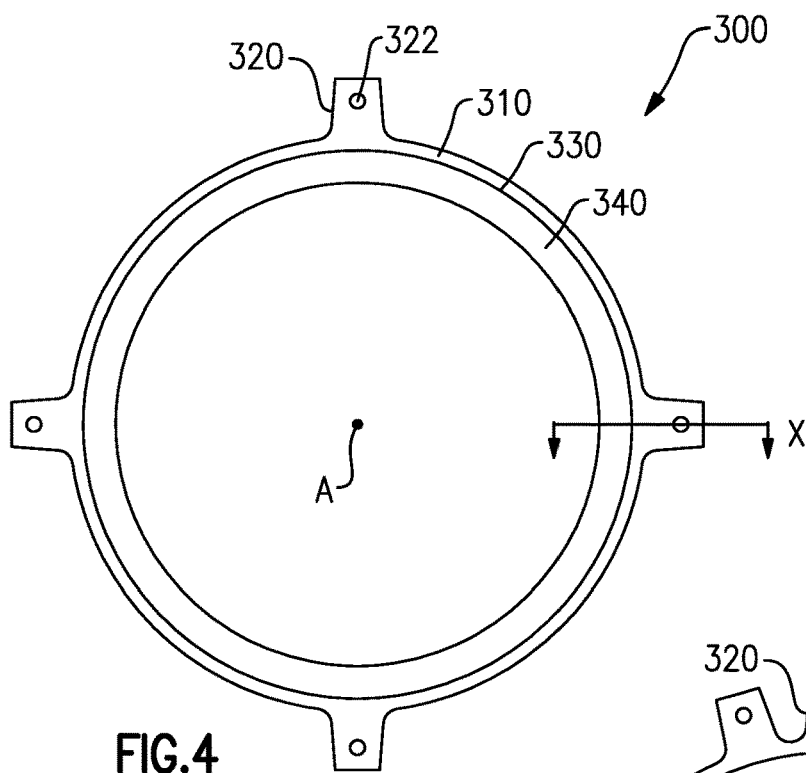
FIG. 4 schematically illustrates a fore view of a retaining plate.
Figure 4A:
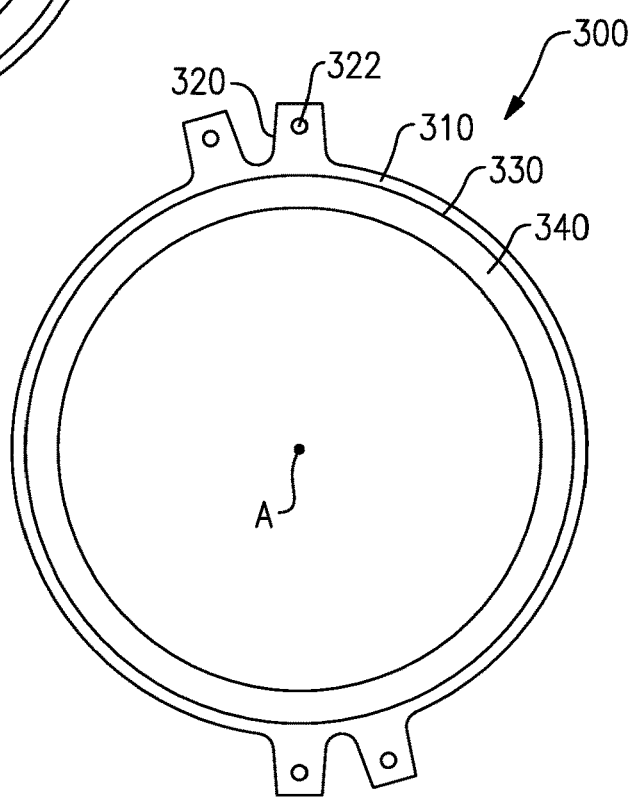
FIG. 4A illustrates an alternate example retaining plate.

FIG. 4 schematically illustrates a fore view of a simplified retaining plate 300 for use in a seal, such as the face seals 100, 200 illustrated in Figured 2 and 3. The retaining plate 300 includes a main retaining plate body 310, from which radially protruding flanges 320 protrude outward. Each of the retaining flanges 320 includes an opening 322 for receiving a coil spring guide. FIG. 4 illustrates four flanges 320 disposed circumferentially evenly about the retaining plate 300. In alternate examples different numbers of flanges 320 are utilized. In yet further alternate examples, as shown in FIG. 4A, the flanges 320 are disposed circumferentially unevenly about the retaining plate 300 in a circumferentially balanced manner. In a practical embodiment, the number and position of the flanges 320 correspond to flanges of the seal carrier 210 (illustrated in FIG. 3).

In contrast to prior face seals, the seal carrier 210 and the retaining plate 220 each include an axial step region 260. The axial step regions 260 interact with each other, thereby centering the retaining plate 220 relative to the sealing element 230. The axial step regions 260 include two tolerances (a pilot surface 262 of the retaining plate 220 and a pilot flange 218 of the seal carrier 210). As such, a seal overlap 270 need only account for the variation of the two tolerances. Furthermore, there is no interference between the retaining plate 220 and the pilot flange 218 as a result of a gap between the pilot surface 262 and the pilot flange 218. The lack of interference between the pilot portion 262 and the pilot flange 218 is alternately referred to as a loose fit. The tighter radial alignment in turn reduces the radial length of the seal overlap 270 that is required to be present between the retaining plate 220 and the seal element 230.

FIG. 4 schematically illustrates a fore view of a simplified retaining plate 300 for use in a seal, such as the face seals 100, 200 illustrated in FIGS. 2 and 3. The retaining plate 300 includes a main retaining plate body 310, from which radially protruding flanges 320 protrude outward. Each of the retaining flanges 320 includes an opening 322 for receiving a coil spring guide. FIG. 4 illustrates four flanges 320 disposed circumferentially evenly about the retaining plate 300. In alternate examples different numbers of flanges 320 are utilized. In yet further alternate examples, the flanges 320 are disposed circumferentially unevenly about the retaining plate 300 in a circumferentially balanced manner. In a practical embodiment, the number and position of the flanges 320 correspond to flanges of the seal carrier 210 (illustrated in FIG. 3).

Radially inward of the flanges 320, on the main retaining plate body 310 is an axial step 330. As described above, at the axial step 330 the retaining plate body 310 shifts axially via an axial aligned portion 334 (illustrated in FIG. 5). In the illustrated example, the axial step 330 is a full ring of the retaining plate main body 310. A seal overlap portion 340 extends radially inward from the axial step 330.

Figure 5:
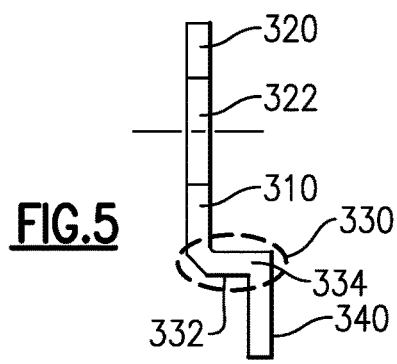
FIG. 5 schematically illustrates a cross sectional view of the retaining plate of FIG. 4.

With continued reference to FIG. 4, and with like numerals indicating like elements, FIG. 5 schematically illustrates a cross section of the retaining plate 300 along view line x. The axial step 330 includes a radially inward pilot surface 332. As described above with regard to FIG. 3, the pilot surface 332 is disposed about a pilot flange 218 of a seal carrier (such as seal carrier 110 illustrated in FIG. 2) in a loose fit arrangement. The pilot surface 332 and the pilot flange 218 of the seal carrier form the axial step region described above. The interfacing between the pilot flange 218 and the pilot surface 332 in the axial step region radially centers the retaining plate 300 relative to the sealing element 230, such that the retaining plate 300 to sealing element 230 relative radial position is primarily controlled by the differences in tolerances between the pilot flange 218 of the seal carrier and the pilot surface 332. The tolerances define a gap between the pilot flange 218 of the seal carrier and the pilot surface 332. In an ideal face seal assembly, this difference is designed to have a minimal length, thereby minimizing the potential radial misalignment that the retaining plate 300 can have. As described above, the minimized potential radial misalignment corresponds directly to a minimized seal overlap 340 required to ensure that the retaining plate 300 provides a full 360 degree arc of radial coverage of the seal element.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A face seal assembly comprising:
   a seal carrier defining an axis and having a pilot flange disposed circumferentially about said axis;

a seal element disposed at least partially in said seal carrier, and contacting an aft facing face of the seal carrier, wherein the aft facing face of the seal carrier is orthogonal to the axis;

a retaining plate connected to one axial end of said seal carrier, said retaining plate having an axial step disposed circumferentially about said retaining plate, wherein said retaining plate further comprises a plurality of radially outward retainer flanges and said seal carrier comprises a plurality of radially outward carrier flanges, and wherein each of said radially outward retainer flanges in said plurality of radially outward retainer flanges corresponds to one of said radially outward carrier flanges of said plurality of radially outward carrier flanges;

wherein said axial step is interfaced with said pilot flange; and wherein said seal element is radially inward of the axial step.

2. The face seal assembly of claim 1, wherein said seal element is a graphitic carbon face seal.

3. The face seal assembly of claim 1, further comprising a coil spring guide connecting each of said radially outward carrier flanges of said plurality of radially outward carrier flanges to said corresponding radially outward retainer flange.

4. The face seal assembly of claim 1, wherein said axial step includes a pilot surface facing radially inward and facing said pilot flange.

5. The face seal assembly of claim 1, wherein said retaining plate further comprise a seal overlap portion, and said seal overlap portion radially covers said seal element on a full 360 degree arc, and wherein said seal overlap portion extends less than a full radial height of the seal element.

6. The face seal assembly of claim 1, wherein said seal element axially overlaps the axial step relative to the axis defined by the seal carrier.

7. A gas turbine engine comprising:
a compressor section connected to a first turbine spool;
a combustor fluidly connected to the compressor section;
a turbine section fluidly connected to the combustor and connected to a second turbine spool;
an engine static structure connected to said first turbine spool and said second turbine spool via a plurality of bearing systems;
at least one face seal assembly sealing at least one bearing system of said plurality of bearing systems, said at least one face seal assembly comprising:
a seal carrier defining an axis and having a pilot flange disposed circumferentially about said axis;
a seal element disposed at least partially in said seal carrier, and contacting an aft facing face of the seal carrier, wherein the aft facing face of the seal carrier is orthogonal to an engine centerline axis;
a retaining plate connected to one axial end of said seal carrier, said retaining plate having an axial step disposed circumferentially about said retaining plate, wherein said retaining plate further comprises a plurality of radially outward retainer flanges and said seal carrier comprises a plurality of radially outward carrier flanges, and wherein each of said radially outward retainer flanges in said plurality of radially outward retainer flanges corresponds to one of said radially outward carrier flanges of said plurality of radially outward carrier flanges; and
wherein said axial step is interfaced with said pilot flange.

8. The gas turbine engine of claim 7, wherein said axial step includes a pilot surface facing radially inward and facing said pilot flange.

9. The gas turbine engine of claim 7, wherein said retaining plate further comprise a seal overlap portion, and said seal overlap portion radially covers said seal element on a full 360 degree arc.

10. The turbine engine of claim 7, wherein the seal element is partially disposed between the seal carrier and the retaining plate.

* * * * *